R. H. WAPPLER.
CAUTERY ELECTRODE.
APPLICATION FILED FEB. 12, 1919.

1,366,756.

Patented Jan. 25, 1921.

INVENTOR
Reinhold H. Wappler
BY Walton Harrison,
ATTORNEY

UNITED STATES PATENT OFFICE.

REINHOLD H. WAPPLER, OF YONKERS, NEW YORK, ASSIGNOR TO WAPPLER ELECTRIC COMPANY, INC., A CORPORATION OF NEW YORK.

CAUTERY-ELECTRODE.

1,366,756.  Specification of Letters Patent.  Patented Jan. 25, 1921.

Application filed February 12, 1919. Serial No. 276,583.

*To all whom it may concern:*

Be it known that I, REINHOLD H. WAPPLER, a citizen of the United States, residing at Yonkers, county of Westchester, and State of New York, have invented certain new and useful Improvements in Cautery-Electrodes, of which the following is a full, clear, and concise description.

My invention relates to cautery electrodes of the kind used by surgeons and physicians for burning or searing living tissues.

A cautery electrode of this type consists of a shank adapted to be detachably mounted upon a supporting handle, and which carries an electrically heated member analogous to a knife blade and usually designated as a knife.

More particularly stated, I seek to improve the shank of the cautery electrode, so as to confer upon it a maximum of strength and stiffness combined with lightness, and to improve its insulation as well as to simplify and cheapen its cost of manufacture.

Reference is made to the accompanying drawing forming a part of this specification, and in which like letters indicate like parts throughout all of the figures.

Two rods 6, 7, each having in cross section a substantially semi-cylindrical form, or in other words "half-round" rods, are so arranged that their rotund or convex surfaces are disposed outwardly, thus tending to give the shank an approximately cylindrical form.

Figure 5:
Fig. 5 is a section on the line 5—5 of Fig. 1, looking in the direction indicated by the arrow.

Sandwiched between the two rods 6, 7 is a strip 8 of insulating material, in this instance sheet mica, so disposed that each of its faces, throughout the entire width of the strip, as seen in cross section in Fig. 5, is in actual contact with the inner face of the adjacent rod 6 or 7.

Figure 1:
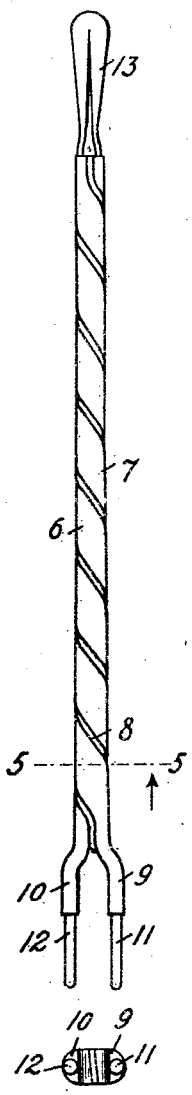
Figure 1 is a side elevation of one form of my cautery electrode complete, the device in this instance being of rather large size.

The two rods with the intermediate strip of mica are twisted together as shown in Fig. 1, so as to constitute a longitudinal straight shank in the form of a solid cylinder.

The end portions 9, 10 are bent outwardly and rendered parallel to each other, and are provided with terminal pins 11, 12, to be detachably fitted into a supporting handle.

The part 13 is adapted to be electrically heated and used after the manner of a blade, and is hence designated as the knife.

Referring particularly to Fig. 5, it will be noted that the shank of the electrode contains no unfilled crevices, voids or spaces. In other words, the shank, though composite, is built up solid throughout. This is because the rods 6, 7 fit neatly and squarely against the faces of the mica strip 8, from edge to edge and from end to end thereof. There being no vacant space inside of the shank, no portion of the shank is easily stretched, compressed or distorted. Each rod 6, 7, acts as a brace for the other, and that, too, as a brace with a relatively large bearing surface. Each rod 6, 7, has an effective bearing surface equal in area to the adjacent mating face of the mica strip 8, and as a consequence each rod braces the other, through the thickness of the mica strip, and throughout an area measured by the length and width of the strip.

The mica strip 8 need not be held in position by any adhesive, or confined in any manner except by its contact with the rods 6, 7. The strip is effectively held in position by the clamping action of the rods 6, 7, and because the strip, held in a spiral form, is unable to move edgewise. In consequence of this spiral form the strip could not become displaced even if it were loose relatively to the rods.

The insulation afforded by the strip of mica, arranged as above described, is very reliable, as no contact can take place between the rods 6, 7.

Figure 2:
Fig. 2 is a side elevation of a slightly different form of my device, of a size smaller than that shown in Fig. 1, and as yet unfinished.

In Fig. 2, I show a slightly different form of my device, and made in smaller size than the one shown in Fig. 1, but left unfinished. The semicylindrical rods 14, 15, are separated by a strip 16 of mica, these parts being twisted into spiral form, the end portions 17 being left untwisted. The end portion 18 is a loop common to both of the rods, and which is cut away and supplanted by a knife.

Figure 3:
Fig. 3 is a side elevation of the cautery electrode complete, that is, made by finishing the structure shown in Fig. 2.
Figure 4:
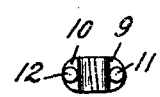
Fig. 4 is an end elevation of the construction appearing in Fig. 1.

In Fig. 3, I show the completed article which in Fig. 2 is shown as unfinished.

The terminal pins 19, 20 are formed, and the knife 21 is added and shaped up from suitable material.

The form shown in Fig. 3 differs from that appearing in Fig. 1 chiefly in the fact that in Fig. 3 the convolutions made by the twist of the rods 14, 15 and mica strip 16 are of somewhat steeper pitch, owing to the fact that in making the shank of small diameter it is practicable to twist the shank rather tightly.

My construction of cautery electrode is of special advantage in instances where, for any reason, the shank is to have a small diameter. It is obvious that with the advantage of strength and stiffness combined with lightness, the diameter of the shank can be less than would otherwise be necessary.

I do not limit myself to the particular structure shown, as variations may be made therein without departing from my invention, the scope of which is commensurate with my claims.

I claim:

1. A cautery electrode having a shank made up of two semi-cylindrical rods and a strip of insulating material sandwiched therebetween, the rods and strip being each of spiral form, the width of said strip at any point being substantially equal to the general diameter of the shank at the same point, and each rod making actual contact with said strip throughout the width and length of said strip.

2. A cautery electrode provided with a shank made up of a plurality of rods, each having a general spiral form, and a strip of mica sandwiched in between said rods and also having a spiral form, the width of said strip at any given point along its length being equal to the proximate diameter of the shank at such point.

REINHOLD H. WAPPLER.